US010020007B2

(12) United States Patent
Mizumoto et al.

(10) Patent No.: US 10,020,007 B2
(45) Date of Patent: Jul. 10, 2018

(54) CONVERSATION ANALYSIS DEVICE, CONVERSATION ANALYSIS METHOD, AND PROGRAM

(71) Applicant: HONDA MOTOR CO., LTD., Tokyo (JP)

(72) Inventors: Takeshi Mizumoto, Wako (JP); Kazuhiro Nakadai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/097,431

(22) Filed: Apr. 13, 2016

(65) Prior Publication Data
US 2016/0307571 A1 Oct. 20, 2016

(30) Foreign Application Priority Data
Apr. 20, 2015 (JP) ................... 2015-086269

(51) Int. Cl.
*G10L 25/51* (2013.01)
*H04L 12/18* (2006.01)
*H04M 3/42* (2006.01)
*G10L 25/78* (2013.01)

(52) U.S. Cl.
CPC .......... *G10L 25/51* (2013.01); *H04L 12/1831* (2013.01); *G10L 25/78* (2013.01); *H04M 3/42221* (2013.01)

(58) Field of Classification Search
CPC ............................ H04L 12/1831; H04M 3/567
See application file for complete search history.

(56) References Cited

U.S. PATENT DOCUMENTS

| | | | | | |
|---|---|---|---|---|---|
| 5,761,389 | A | * | 6/1998 | Maeda | G06N 5/025 706/11 |
| 6,038,554 | A | * | 3/2000 | Vig | G06Q 10/0875 705/306 |
| 7,490,092 | B2 | * | 2/2009 | Sibley | G06F 17/3002 |
| 8,195,522 | B1 | * | 6/2012 | Sonne | G06Q 30/02 705/26.2 |
| 9,703,858 | B2 | * | 7/2017 | Franceschini | G06F 17/30958 |
| 9,710,570 | B2 | * | 7/2017 | Franceschini | G06F 17/30958 |
| 9,734,196 | B2 | * | 8/2017 | Franceschini | G06F 17/30424 |
| 9,773,054 | B2 | * | 9/2017 | Franceschini | G06F 17/30628 |
| 9,805,139 | B2 | * | 10/2017 | Franceschini | G06F 17/30958 |

(Continued)

FOREIGN PATENT DOCUMENTS

| | | |
|---|---|---|
| JP | 2007-218933 | 8/2007 |
| JP | 2011-053629 | 3/2011 |

(Continued)

OTHER PUBLICATIONS

Japanese Office Action, Notice of Reasons for Rejection, dated Feb. 7, 2017, 6 pages, English translation included.

*Primary Examiner* — Michael N Opsasnick
(74) *Attorney, Agent, or Firm* — Rankin, Hill & Clark LLP

(57) ABSTRACT

A conversation analysis device includes an utterance data acquisition unit that acquires utterance data representing a voice of each speaker and an utterance of the speaker, a speech state analysis unit that analyzes a speech state of each speaker on the basis of the voice, and a degree-of-contribution calculation unit that calculates a degree of contribution to the conversation of each speaker on the basis of the speech state.

8 Claims, 8 Drawing Sheets

(56) References Cited

U.S. PATENT DOCUMENTS

| | | | |
|---|---|---|---|
| 9,811,521 B2* | 11/2017 | Sanio | G06F 17/30038 |
| 2005/0216443 A1* | 9/2005 | Morton | G06F 17/3002 |
| 2007/0129942 A1* | 6/2007 | Ban | G06F 17/241 |
| | | | 704/235 |
| 2011/0029893 A1* | 2/2011 | Roberts | G06Q 10/10 |
| | | | 715/753 |
| 2011/0078156 A1* | 3/2011 | Koss | G06Q 10/04 |
| | | | 707/748 |
| 2012/0002798 A1* | 1/2012 | Chen | H04L 12/1827 |
| | | | 379/203.01 |
| 2012/0117078 A1* | 5/2012 | Morton | G06F 17/3002 |
| | | | 707/741 |
| 2012/0221965 A1* | 8/2012 | Takeyoshi | G06Q 50/01 |
| | | | 715/753 |
| 2013/0117279 A1* | 5/2013 | Massey | G06Q 10/10 |
| | | | 707/748 |
| 2013/0132138 A1* | 5/2013 | Doganata | G06Q 10/06 |
| | | | 705/7.11 |
| 2013/0268536 A1* | 10/2013 | Nachiappan | G06Q 50/01 |
| | | | 707/741 |
| 2014/0081643 A1* | 3/2014 | John | G06F 17/27 |
| | | | 704/270 |
| 2014/0258413 A1* | 9/2014 | Brieskorn | H04M 3/567 |
| | | | 709/204 |
| 2014/0351719 A1* | 11/2014 | Cattermole | H04L 65/403 |
| | | | 715/753 |
| 2015/0163362 A1* | 6/2015 | Dickins | H04M 3/569 |
| | | | 379/202.01 |
| 2016/0117624 A1* | 4/2016 | Flores | G06Q 10/06393 |
| | | | 705/7.39 |
| 2016/0125200 A1* | 5/2016 | York | G06F 21/6254 |
| | | | 726/1 |

FOREIGN PATENT DOCUMENTS

| | | |
|---|---|---|
| JP | 4816221 | 9/2011 |
| JP | 2013-058221 | 3/2013 |
| JP | 2013-105374 | 5/2013 |

* cited by examiner

FIG. 4

```
2015-04-07 15:03
X: WHAT SHOULD WE DO TO INCREASE SALES THIS YEAR?

2015-04-07 15:04
Y: SINCE THE ECONOMY HAS BEEN BAD FOR SEVERAL YEARS,
   IT WILL BE DIFFICULT TO INCREASE...
   IT IS BARELY STABLE.
              ⋮
2015-04-07 15:13
Z: SO, WHAT IF WE ORGANIZED A CAMPAIGN WITH A SPECIFIC TARGET?

2015-04-07 15:14
Y: WELL, WHAT ABOUT RECENT TRANSPLANTS TO DISTRICT S?

2015-04-07 15:15
X: PEOPLE IN THAT REGION DO HAVE HIGH INCOMES, IT'S PROMISING.
              ⋮
```
Tx01

Tx02
```
2015-04-07 15:23
X: WE'LL STRENGTHEN THE CAMPAIGN FOR TRANSPLANTS.
```

FIG. 5

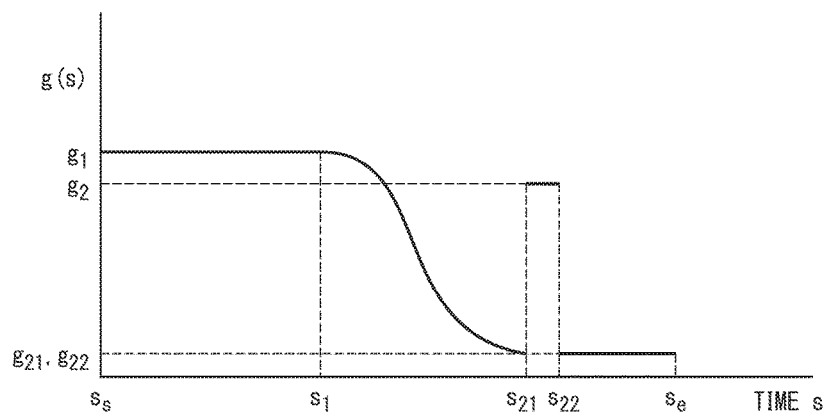

CONVERSATION ANALYSIS DEVICE, CONVERSATION ANALYSIS METHOD, AND PROGRAM

CROSS-REFERENCE TO RELATED APPLICATION

Priority is claimed on Japanese Patent Application No. 2015-086269, filed Apr. 20, 2015, the content of which is incorporated herein by reference.

BACKGROUND OF THE INVENTION

Field of the Invention

The present invention relates to a conversation analysis device, a conversational analysis method, and a program.

Description of Related Art

Conventionally, a voice conference device that records voices of a plurality of persons in a conference has been proposed. For example, Japanese Patent No. 4816211 (hereinafter, Patent Document 1) discloses a voice conference device including two microphone arrays in the front and back of a housing, a speaker array including a plurality of speakers arranged in a straight line on a lower surface of the housing, two signal processing units and selection means, and a playback signal processing unit that supplies an audio signal to the speaker array.

Meanwhile, communication is an important element in actions performed by multiple persons. In a variety of work-related tasks and other actions, efficiency of conversation, conference, and other communications is expected. Therefore, participants may need to actively participate in a discussion or strive for consensus.

SUMMARY OF THE INVENTION

However, the voice conference device disclosed in Patent Document 1 does not have means for acquiring an objective degree of contribution of participants to the discussion. Therefore, the participants lack motivation to perform efficient discussion.

An aspect of the present invention has been made in view of the above point, and an object of the present invention is to provide a conversation analysis device, a conversation analysis method, and a program capable of acquiring a degree of contribution to a discussion.

To achieve the above object, the present invention adopts the following aspects.

(1) A conversation analysis unit according to an aspect of the invention includes an utterance data acquisition unit that acquires utterance data representing a voice of each speaker and an utterance of the speaker; a speech state analysis unit that analyzes a speech state of each speaker on the basis of the voice; and a degree-of-contribution calculation unit that calculates a degree of contribution to the conversation of each speaker on the basis of the speech state.

(2) In the aspect of (1), the speech state analysis unit may include a degree-of-activity calculation unit that calculates a degree of activity in the conversation on the basis of an utterance time as the speech state.

(3) In the aspect of (1) or (2), the speech state analysis unit may include an interruption determination unit that determines interruption of an utterance of another speaker as the speech state.

(4) In the aspect of any one of (1) to (3), the speech state analysis unit may include a conclusion mention determination unit that determines an utterance mentioning an element of a conclusion of the conversation as the speech state.

(5) In the aspect of any one of (1) to (4), the conversation analysis device may include a conversation evaluation unit that calculates an evaluation value indicating a contribution state between speakers in the conversation on the basis of the degree of contribution of each speaker.

(6) In the aspect of any one of (1) to (5), the conversation analysis device may include an utterance data analysis unit that specifies an utterance including a section in which activity of the utterance is higher than a predetermined threshold of the activity in the utterance data.

(7) A conversation analysis method according to an aspect of the present invention is a conversation analysis method in a conversation analysis device, including: an utterance data acquisition step of acquiring utterance data representing a voice of each speaker and an utterance of the speaker; a speech state analysis step of analyzing a speech state of each speaker on the basis of the voice; and a degree-of-contribution calculation step of calculating a degree of contribution to the conversation of each speaker on the basis of the speech state.

(8) An aspect of the present invention is a computer-readable non-transitory recording medium including a program for causing a computer of a conversation analysis device to execute: an utterance data acquisition process of acquiring utterance data representing a voice of each speaker and an utterance of the speaker; a speech state analysis process of analyzing a speech state of each speaker on the basis of the voice; and a degree-of-contribution calculation process of calculating a degree of contribution to the conversation of each speaker on the basis of the speech state.

According to the above-described aspect of (1), (7), or (8), the degree of contribution quantitatively indicating the degree of contribution of the speaker participating in the conversation is acquired. Efficiency of the conversation is achieved by encouraging the contribution of the speaker to the conversation on the basis of the degree of contribution.

In the case of the above-described (2), a degree of activity quantitatively indicating the degree of activity of the utterance of the speaker participating in the conversation is acquired. Efficiency of conversation is achieved by encouraging active utterances in the interlocution from the speaker on the basis of the degree of activity.

In the case of the above-described (3), the interruption of the utterance of another speaker is determined as the speech state. Efficiency of the conversation is achieved by avoiding interruption of the speaker or encouraging valid interruption on the basis of a determined degree of interruption of utterances.

In the case of the above-described (4), the utterance mentioning the element of the conclusion is specified as the speech state. Efficiency of the conversation is achieved by encouraging the speaker to produce an utterance inducing the conclusion based on the specified degree of the utterance mentioning the element of the conclusion.

In the case of the above-described (5), the evaluation value quantitatively indicating the contribution state between speakers participating in the conversation is acquired. Efficiency of the conversation is achieved by encouraging improvement of the contribution state between the speakers on the basis of the evaluation value.

In the case of the above-described (6), the utterance including the section in which the activity is high among utterances forming the conversation is extracted as an utterance having a high contribution to the conversation. It is possible to efficiently perform recognition of content of the utterance or analysis of a speech state in the conversation on the basis of the extracted utterance.

BRIEF DESCRIPTION OF THE DRAWINGS

FIG. 4 is a diagram illustrating a method of determining a conclusion mention section according to the first embodiment.

FIG. 5 is a diagram illustrating an example of a degree-of-importance function according to the first embodiment.

DETAILED DESCRIPTION OF THE INVENTION

First Embodiment

Hereinafter, a first embodiment of the present invention will be described with reference to the drawings.

Figure 1:
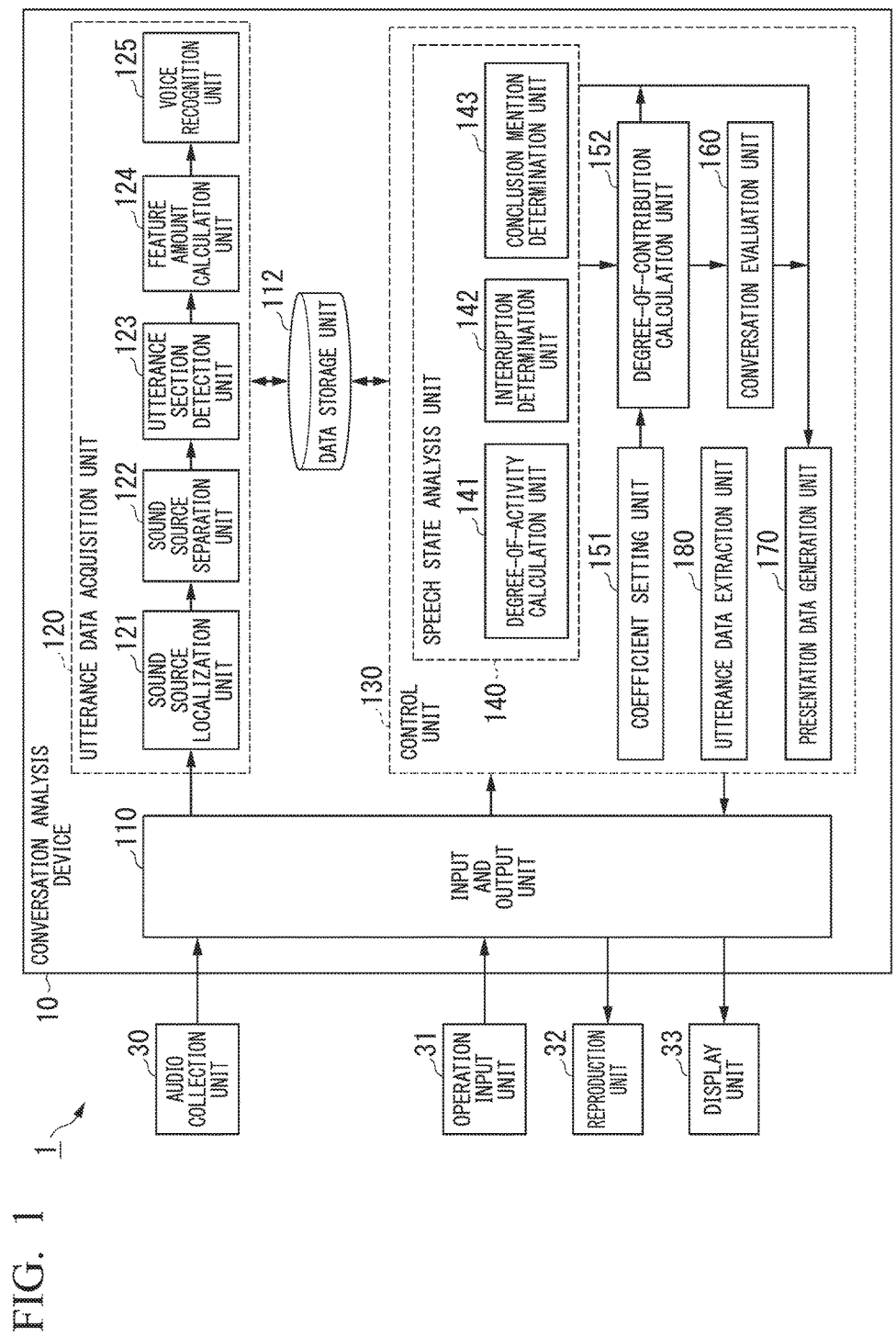
FIG. 1 is a block diagram illustrating a configuration of a conversation analysis system according to a first embodiment.

FIG. 1 is a block diagram illustrating a configuration of a conversation analysis system 1 according to this embodiment.

The conversation analysis system 1 includes a conversation analysis device 10, a sound collection unit 30, an operation input unit 31, a reproduction unit 32, and a display unit 33.

The conversation analysis device 10 acquires a voice of each speaker and utterance data representing utterances of the speaker, which are indicated by an audio signal input from the sound collection unit 30. The conversation analysis device 10 analyzes a speech state of each speaker on the basis of the audio signal, and calculates a degree of contribution to a conversation of each speaker on the basis of the analyzed speech state.

The sound collection unit 30 collects sound that reaches the sound collection unit, and generates audio signals of M channels (M is an integer equal to or greater than 1) based on the collected sound. The sound collection unit 30 includes, for example, M microphones, and is a microphone array formed by arranging the respective microphones at different positions. The sound collection unit 30 transmits the generated audio signal to the conversation analysis device 10.

The operation input unit 31 receives an operation input of a user and generates an operation signal corresponding to the received operation input. The operation input unit 31 transmits the generated operation signal to the conversation analysis device 10. The operation input unit 31 includes, for example, any one or any combination of a touch sensor, a mouse, a keyboard, and the like.

The reproduction unit 32 reproduces the sound on the basis of the audio signal input from the conversation analysis device 10. The reproduction unit 32 includes, for example, a speaker.

The display unit 33 displays an image based on the image signal input from the conversation analysis device 10. The display unit 33 includes, for example, any one of a liquid crystal display (LCD) and an organic electroluminescence (EL) display. The input image signal is, for example, presentation data representing various display screens.

Next, a configuration of the conversation analysis device 10 according to this embodiment will be described.

The conversation analysis device 10 includes an input and output unit 110, a data storage unit 112, an utterance data acquisition unit 120, and a control unit 130. The conversation analysis device 10 may include dedicated hardware or may be realized by executing a process instructed by a predetermined program on general-purpose hardware. The conversation analysis device 10 may include, for example, an electronic device such as a personal computer, a mobile phone (including a so-called smart phone), or a tablet terminal device, as the general-purpose hardware.

The input and output unit 110 inputs or outputs a variety of data from and to another device. A line used for the input and output unit 110 to input and output data from and to the other device may be a cable or a wireless line.

The input and output unit 110, for example, outputs the audio signal input from the sound collection unit 30 to the utterance data acquisition unit 120, and outputs the operation signal input from the operation input unit 31 to the control unit 130. Further, the input and output unit 110 outputs an audio signal and an image signal input from the control unit 130 to the reproduction unit 32 and the display unit 33. The input and output unit 110 is, for example, a data input and output interface.

The utterance data acquisition unit 120 acquires the utterance data representing the voice of each speaker and the utterances of the speaker from the audio signal input from the sound collection unit 30 via the input and output unit 110. The utterance data acquisition unit 120 includes a sound source localization unit 121, a sound source separation unit 122, an utterance section detection unit 123, a feature amount calculation unit 124, and a voice recognition unit 125.

The sound source localization unit 121 calculates directions of respective sound sources on the basis of audio signals of the M channels input from the input and output unit 110 at every predetermined length of time (for example, 50 ms). The sound source localization unit 121 uses, for example, a Multiple Signal Classification (MUSIC) method in the calculation of the sound source directions. The sound source localization unit 121 outputs sound source direction information indicating the calculated sound source direction of each sound source and the audio signals of the M channels to the sound source separation unit 122.

The audio signals of the M channels and the sound source direction information are input from the sound source localization unit 121 to the sound source separation unit 122. The sound source separation unit 122 separates the audio signals of the M channels into sound-source-specific audio signal for respective sound sources on the basis of the sound source directions indicated by the sound source direction information.

The sound source separation unit 122 uses, for example, a Geometric-constrained High-order Decorrelation-based Source Separation (GHDSS) method. The sound source separation unit 122 outputs the separated sound-source-specific audio signal for respective sound sources to the utterance section detection unit 123. Here, each speaker speaks as the sound source. Therefore, the sound-source-specific audio signal corresponds to an audio signal representing the utterances of each speaker.

The utterance section detection unit 123 detects an utterance section from the sound-source-specific audio signal input from the sound source separation unit 122 in each section at a predetermined time interval. The utterance section detection unit 123 performs, for example, voice activity detection (VAD) such as a zero-crossing method or a spectral entropy method when the utterance section is specified. The utterance section detection unit 123 determines a section specified as a voice section to be the utterance section and generates utterance section data indicating whether or not the section is the utterance section. The utterance section detection unit 123 outputs the utterance section data and the sound-source-specific audio signal to the feature amount calculation unit 124 in association with each other in each section.

The utterance section data and the sound-source-specific audio signal are input from the utterance section detection unit 123 to the feature amount calculation unit 124. The feature amount calculation unit 124 calculates an acoustic feature amount at predetermined time intervals (for example, 10 ms) with respect to a section indicated as an utterance section by the utterance section data. The acoustic feature amount includes, for example, a 13-order Mel-scale logarithmic spectrum (MSLS). A 13-order delta MSLS or delta power may be included in one set of acoustic feature amounts. Delta MSLS is a difference between MSLS of an immediately previous frame (previous time) and MSLS at that time point (the current time). The delta power is a difference between power at a previous time and power at a current time. The acoustic feature amount is not limited thereto and, for example, may be a Mel-frequency Cepstrum coefficient (MFCC). The feature amount calculation unit 124 associates the calculated acoustic feature amount and the utterance section data with each other for each section, and outputs the acoustic feature amount and the utterance section data to the voice recognition unit 125.

The voice recognition unit 125 performs a voice recognition process on the acoustic feature amount input from the feature amount calculation unit 124 using the voice recognition data prestored in the data storage unit 112 to generate text data representing content of the utterances. The voice recognition data is data used for the voice recognition process, such as an acoustic model, a language model, and a word dictionary. The acoustic model is data used to recognize phonemes from the acoustic feature amount. The language model is data used to recognize a set of a plurality of words from a phoneme sequence including a plurality of adjacent phonemes. The word dictionary is data representing a word which is a candidate for the phoneme sequence forming text data, which is a result of the recognition. The acoustic model is, for example, a continuous hidden Markov model (HMM). The continuous HMM is a model in which an output distribution density is a continuous function, and the output distribution density is represented through weighted addition based on a plurality of normal distributions. The language model is, for example, an N-gram indicating constraints of the phoneme sequence including phonemes subsequent to a certain phoneme or a transition probability of each phoneme sequence.

The voice recognition unit 125 associates the text data generated for each sound source, that is, speaker, the sound-source-specific audio signal representing the content of the utterances, and the utterance section data for each section to generate utterance data. The voice recognition unit 125 stores the utterance data generated for each speaker in the data storage unit 112.

The data storage unit 112 stores various data used for the process performed by the conversation analysis device 10, and various data generated through the process. For example, the voice recognition data and the utterance data for each speaker described above are stored in the data storage unit 112 for each session. The session refers to an individual conversation. In the following description, the conversation refers to a set of utterances among a plurality of speakers relating to a common subject. That is, a plurality of utterances are typically included in the conversation of one session.

In the following description, the conversation also includes a meeting, forum, discussion, and the like, which are collectively referred to as the conversation. A date and time of the beginning of the session, a date and time of the end of the session, or a duration of the session may be included in the utterance data for each session. The data storage unit 112 includes, for example, a variety of storage media such as a Random Access Memory (RAM) and a Read-only Memory (ROM).

The control unit 130 includes a speech state analysis unit 140, a coefficient setting unit 151, a degree-of-contribution calculation unit 152, a conversation evaluation unit 160, a presentation data generation unit 170, and an utterance data extraction unit 180.

The speech state analysis unit 140 reads the utterance data designated by the operation signal from the operation input unit 31 from the data storage unit 112. The speech state analysis unit 140 analyzes the speech state from the voice of each speaker indicated by the read utterance data. The speech state analysis unit 140 outputs speech state data indicating the speech state obtained by the analysis to the degree-of-contribution calculation unit 152. The speech state analysis unit 140 includes a degree-of-activity calculation unit 141, an interruption determination unit 142, and a conclusion mention determination unit 143.

The degree-of-activity calculation unit 141 calculates a degree of activity $U_i$ in the conversation of the speaker i participating in the conversation on the basis of an utterance time d which is a duration of each utterance section indicated by the utterance section data included in the utterance data. The degree of activity $U_i$ is one indicator of the degree of contribution to the conversation attributable to an utterance. The degree of activity $U_i$ is a degree of activity of the utterance in the conversation, and indicates a measurement of the utterance. This means that the contribution of the speaker i of a higher degree of activity $U_i$ is higher and the contribution of the speaker i of a lower degree of activity $U_i$ is lower. The degree-of-activity calculation unit 141 outputs the degree of activity data indicating the degree of activity $U_i$ as a portion of the speech state data to the degree-of-contribution calculation unit 152 and the presentation data generation unit 170.

Further, the degree-of-activity calculation unit 141 outputs utterance time data indicating an utterance time of each utterance section to the interruption determination unit 142. The utterance time is a time between an utterance start time and an utterance end time. A method of calculating the degree of activity $U_i$ will be described below.

The interruption determination unit 142 determines interruption by a speaker i of the utterance of another speaker j on the basis of the utterance section of each speaker indicated by the utterance time data input from the degree-of-activity calculation unit 141. The interruption determination unit 142 multiplies an effective utterance amount $u_{ij}$ (which will be described below) of the utterance of the successful interruption of the other speaker j by the speaker i by a first predetermined coefficient $\alpha_1$ to calculate an utterance-specific interruption amount according to the utterance. The interruption determination unit 142 multiplies an effective utterance amount $u_{ij}$ for an utterance of a speaker failing in the interruption by a second predetermined coefficient $\alpha_2$ to calculate an utterance-specific interruption amount indicating effectiveness of the interruption related to the utterance. Here, $\alpha_1$ and $\alpha_2$ are an integer greater than 1 (for example, 1.5), and an integer smaller than 1 (for example, 0.5), respectively. That is, the utterance-specific interruption amount of the utterance of the successful interruption is larger than the utterance-specific interruption amount of the utterance of the unsuccessful interruption.

The interruption determination unit 142 calculates a sum of the utterance-specific interruption amounts in a conversation of each set of a speaker and another speaker as an interrupting amount $I_{ij}$. Further, the interruption determination unit 142 calculates a sum in the conversation of the effective utterance amount $u_{ji}$ of each utterance of another speaker j interrupting a certain speaker i as an interrupted amount $I_{ji}$. The interruption determination unit 142 outputs interruption amount data representing the calculated interrupting amount $I_{ij}$ and the calculated interrupted amount $I_{ji}$ as another portion of the speech state data to the degree-of-contribution calculation unit 152 and the presentation data generation unit 170. Whether or not the interruption succeeds will be described below.

The conclusion mention determination unit 143 reads text data in the section (conclusion section) representing the conclusion of the conversation from the data storage unit 112. The read text data is data indicating a sentence (conclusion sentence) representing the conclusion. As the text data in the conclusion section, for example, text data included in the utterance data in an extraction section designated by an operation signal from the operation input unit 31 may be used in the utterance data extraction unit 180. The conclusion mention determination unit 143 determines a section representing a phrase which is an element of a conclusion portion in the text data representing the voice of each speaker in the conversation to be a conclusion mention section. The conclusion mention determination unit 143 calculates the conclusion mention amount $R_i$ on the basis of the conclusion mention section of each speaker i. The conclusion mention determination unit 143 outputs conclusion mention amount data indicating the calculated conclusion mention amount $R_i$ as a portion of other speech state data to the degree-of-contribution calculation unit 152 and the presentation data generation unit 170. A method of determining the conclusion mention section and a method of calculating the conclusion mention amount $R_i$ will be described below.

The coefficient setting unit 151 determines a weight coefficient used to calculate the degree of contribution from the degree of activity $U_i$, the interrupting amount $I_{ij}$, the interrupted amount $I_{ji}$, and the conclusion mention amount $R_i$ as the index values indicated by the speech state data. The coefficient setting unit 151 determines, for example, a weight coefficient for each index value on the basis of the operation signal from the operation input unit 31. The coefficient setting unit 151 outputs coefficient data indicating the determined weight coefficient to the degree-of-contribution calculation unit 152.

The degree-of-contribution calculation unit 152 calculates a degree of contribution $C_i$ to the conversation of each speaker i on the basis of the speech state data input from the speech state analysis unit 140. Specifically, the degree-of-contribution calculation unit 152 multiplies the corresponding index value by the weight coefficient for each index value indicated by the coefficient data input from the coefficient setting unit 151 to calculate a sum of the multiplied values obtained by the multiplication as the degree of contribution $C_i$. The degree-of-contribution calculation unit 152 outputs degree-of-contribution data indicating the calculated degree of contribution $C_i$ to the conversation evaluation unit 160. A method of calculating the degree of contribution $C_i$ will be described below.

The conversation evaluation unit 160 acquires an evaluation value indicating the contribution state between speakers in the conversation on the basis of the degree of contribution $C_i$ of each speaker i indicated by the degree-of-contribution data received from the degree-of-contribution calculation unit 152. The conversation evaluation unit 160 calculates, for example, a total degree of contribution and a degree-of-contribution ratio (degree-of-contribution balance) as evaluation values. The total degree of contribution C is a sum of the degree of contribution $C_i$ of each speaker i (i is integer equal to or more than 1 and equal to or less than N, and N is an integer equal to or more than 2 which indicates the number of participants in the conversation). The total degree of contribution C indicates all degrees of contribution of utterances of all speakers participating in the conversation. The degree-of-contribution ratio P is a ratio of a minimum value $C_{min}'$ between the speakers of a relative evaluation value $C_i'$ ($=C_i/C$) obtained by normalizing the degree of contribution $C_i$ of each speaker i with the total degree of contribution C to a maximum value $C_{max}'$ ($=C_{min}'/C_{max}'$). The degree-of-contribution ratio P indicates magnitude of a distribution of the relative evaluation value $C_i'$ between the speakers. That is, this shows that the distribution of the relative evaluation value $C_i'$ is larger between the speakers as the degree-of-contribution ratio P is lower. A state in which the degree-of-contribution ratio P is low may include, for example, a state in which utterances of a specific speaker in the conversation are prevalent and utterances of another speaker are scarce, that is, the utterances of the specific speaker are dominant. A state in which the degree-of-contribution ratio P is high may include, for example, a state in which contribution of all the speakers is similar, that is, all the speakers uniformly participate in the conversation. A maximum value and a minimum value of the degree-of-contribution ratio P are 1 and 0, respectively.

The conversation evaluation unit 160 outputs conversation evaluation data indicating the calculated evaluation value to the presentation data generation unit 170.

The conversation evaluation unit 160 may calculate a variance or a standard deviation of the relative evaluation value $C_i'$ in place of the degree-of-contribution ratio P as the evaluation value indicating the magnitude of a distribution of the relative evaluation value $C_i$ among speakers.

Further, the conversation evaluation unit 160 may specify speakers for each conversation on the basis of the utterance data and calculate the degree of contribution $C_i$ related to the conversation including a combination of the specified speakers as participants. Evaluation of the combination of the speakers will be described below.

Further, the conversation evaluation unit 160 may determine a place in an order of the degree of contribution $C_i$ of the speaker i participating in a certain conversation (session) or the relative evaluation value $C_i'$, and classify the determined place into one (evaluation label) of ranks of a predetermined number of steps. In this case, the conversation evaluation unit 160 determines the classified evaluation label of the speaker i as one item of the evaluation value. For example, it is assumed that the ranks of the speaker i are classified into ranks of 10 steps at 10% intervals from the speaker i having the highest degree of contribution $C_i$ or the greater relative evaluation value $C_i'$, and evaluation labels of the respective ranks are A+, A, A−, B+, B, B−, C+, C, C−, and D in order. When the degree of contribution $C_j$ of the speaker j ranks eighteenth among 100 persons, the conversation evaluation unit 160 determines the evaluation label of the speaker j to be A. The number of steps is not necessarily limited to 10, and the number of steps may be 9 or 11 as long as the number of steps is 2 or more. Further, the classification into the ranks is not limited to the classification based on the order, and the ranks may be classified on the basis of a deviation from the average value of the degree of contribution $C_i$ or the relative evaluation value $C_i'$ for each speaker i.

Further, when conversations of a plurality of sessions have already been performed, the conversation evaluation unit 160 may determine the order of the total degrees of contribution of the conversations of the individual sessions, and classify the places in the determined order into one of ranks of a predetermined number of steps. In this case, the conversation evaluation unit 160 determines the classified evaluation labels of the conversation as another item of the evaluation value.

The speech state data from the speech state analysis unit 140, the degree-of-contribution data from the degree-of-contribution calculation unit 152, and the conversation evaluation data from the conversation evaluation unit 160 are input to the presentation data generation unit 170. The presentation data generation unit 170 generates presentation data indicating presentation information to be displayed on the display screen on the basis of any one or a predetermined combination of the index value of each speaker participating in the conversation indicated by the speech state data, the degree of contribution of each speaker participating in the conversation indicated by the degree-of-contribution data, and the evaluation value indicated by the conversation evaluation data. The presentation data generation unit 170 outputs the generated presentation data to the display unit 33 via the input and output unit 110. Accordingly, the presentation data generation unit 170 can present the presentation information based on any or a predetermined combination of the index value, the degree of contribution, and the evaluation value to the display unit 33. An example of the display screen on which the presentation information is displayed will be described below.

The utterance data extraction unit 180 extracts a predetermined portion (extraction section) from the utterance data stored in the data storage unit 112. The extraction section is designated by, for example, the operation signal input from the operation input unit 31. The extraction section may be designated in any one of a conversation (session) unit, a speaker unit, an utterance unit, and time (start time and end time). The utterance data extraction unit 180 may generate a text image signal representing text of content of an utterance in the extraction section among the text data constituting the utterance data, and output the generated text image signal to the display unit 33 via the input and output unit 110. Accordingly, the text indicated by the output text image signal is displayed on the display unit 33. Further, the utterance data extraction unit 180 extracts a partial audio signal representing the voice of the content of the utterance in the extraction section from the sound-source-specific audio signal constituting the utterance data. Accordingly, a voice indicated by the output partial audio signal is reproduced from the reproduction unit 32.

In order to encourage designation of the extraction section, the utterance data extraction unit 180 may display an extraction section designation screen for designating the extraction portion on the display unit 33.

(Method of Calculating Degree of Activity)

Next, a method of calculating a degree of activity will be described.

Figure 2:
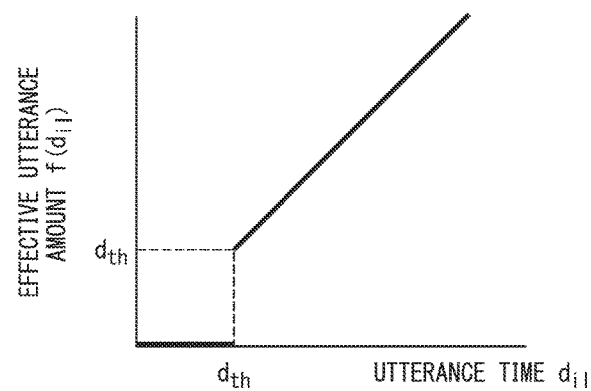
FIG. 2 is a diagram illustrating an effective utterance amount according to the first embodiment.

The degree-of-activity calculation unit 141 specifies the utterance section indicated by the utterance section data related to the speaker participating in the conversation. The degree-of-activity calculation unit 141 determines an effective utterance amount f(d) corresponding to the utterance time d in each specified utterance section. In the example illustrated in FIG. 2, in a case in which an utterance time $d_{i1}$ related to an l-th utterance (l is an integer equal to or greater than 1) of the speaker i is less than a predetermined lower limit $d_{th}$ of the utterance time, the degree-of-activity calculation unit 141 determines a corresponding effective utterance amount $f(d_{i1})$ to be 0. When the utterance time $d_{i1}$ is equal to or greater than the lower limit $d_{th}$, the degree-of-activity calculation unit 141 determines the utterance time $d_{i1}$ to be the corresponding effective utterance amount $f(d_{i1})$. The lower limit $d_{th}$ of the utterance time is, for example, 2 seconds. The degree-of-activity calculation unit 141 calculates a sum $\Sigma_1 f(d_{i1})$ of the effective utterance amount $f(d_{i1})$ of each utterance section in the conversation (session) for each speaker i as the degree of activity $U_i$ of the speaker. That is, the utterance time of the effective utterance in which the utterance time is equal to or more than the lower limit dais used to calculate the degree of activity $U_i$, and a section determined to be an utterance section in which the utterance time is less than the lower limit $d_{th}$ is excluded. Therefore, a short utterance that does not directly contribute to consensus of the conversation, such as a filler, a supportive response, or noise such as sound determined to be an utterance, is excluded.

(Method of Determining Whether Interruption Succeeds)

Figure 3:
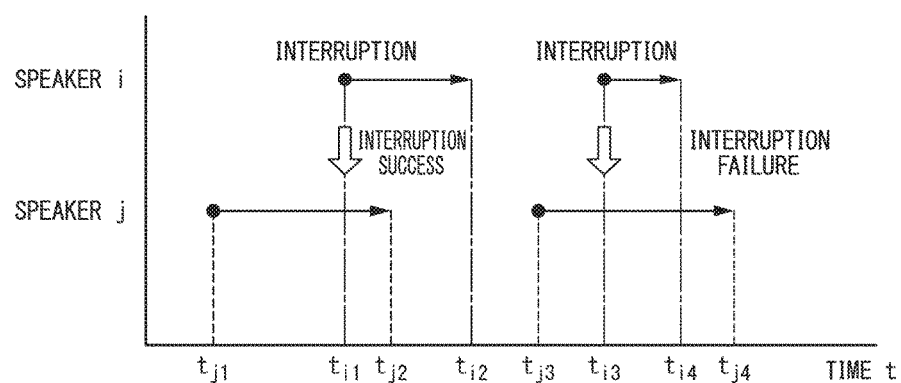
FIG. 3 is a diagram illustrating a method of determining whether interruption succeeds according to the first embodiment.

Next, a method of determining whether interruption succeeds will be described. The interruption refers to when an utterance of another speaker i starts during an utterance of a speaker j. In the example illustrated in FIG. 3, the start of the utterance of the speaker i at time $t_{i1}$ during the utterance of the speaker j from time $t_{j1}$ to time $t_{j2}$, and the start of the utterance of the speaker i at time to during the utterance of the speaker j from time $t_{j3}$ to time $t_{j4}$ are both determined to be interruption.

When the interrupted utterance ends earlier than the utterance of the interruption, the interruption determination unit 142 determines that the interruption succeeds, and when the utterance of the interruption ends earlier than the interrupted utterance, the interruption determination unit 142 determines that the interruption fails. In the example illustrated in FIG. 3, an end time $t_{j2}$ of the interrupted utterance of the speaker j is earlier than an end time to of the utterance of the interruption of the speaker i. Therefore, the interruption determination unit 142 determines that the utterance of the speaker i ending at the end time $t_{i2}$ is an utterance that is successful in the interruption. On the other hand, an end time $t_{i4}$ of the utterance of the interruption of the speaker i is earlier than an end time $t_{j4}$ of the interrupted utterance of the speaker j. Therefore, the interruption determination unit 142 determines that the utterance of the speaker i ending at the end time $t_{i4}$ is an utterance that fails in the interruption.

The interruption determination unit 142 does not treat an utterance of which an utterance time is shorter than a predetermined threshold value of the period of an utterance time (for example, a lower limit $d_{th}$ of the above-described period of an utterance time) among the utterances started by the other speaker i during the utterance of a certain speaker j as the utterance of the interruption. This is because such an utterance does not directly contribute to consensus of the conversation, as described above.

(Method of Determining a Conclusion Mention Section)

Next, a method of determining the conclusion mention section will be described.

FIG. 4 is a diagram illustrating a method of determining a conclusion mention section.

An example of the text data illustrated in FIG. 4 includes text data Tx01 indicating the utterances of each speaker related to a certain conversation, and text data Tx02 in a conclusion section thereof. Each utterance is associated with an utterance start time and the speaker. In the text data Tx01, utterances in a conversation among three speakers X, Y, and Z are arranged in an order of earlier utterance start time. The text data Tx02 shows a conclusion sentence, which is the utterance "We'll strengthen the campaign for transplants" of speaker X starting at 15:23 on Apr. 7, 2015.

The conclusion mention determination unit 143 determines a keyword constituting the conclusion sentence represented by the text data in the acquired conclusion section. The conclusion mention determination unit 143 performs, for example, morphological analysis on the conclusion sentence indicated by the text data Tx02, and specifies the part of speech of each word that is an element of the conclusion sentence. The conclusion mention determination unit 143 determines, as keywords, independent words, such as nouns, verbs, adjectives, adjectival nouns, and adverbs among words of which the part of speech has been specified. The conclusion mention determination unit 143 may exclude a predetermined phrase, such as a name of a speaker, a name of an organization, or an alias thereof among the determined keywords, as a prohibited phrase. The conclusion mention determination unit 143 may determine a phrase indicated by the operation signal input from the operation input unit 31 to be a keyword. Each keyword is not necessarily limited to a single word and may be a compound word or a phrase including a plurality of words. In the example illustrated in FIG. 4, the keywords are the underlined words. For example, in the conclusion sentence "We'll strengthen the campaign for transplants" represented by the text data Tx02, "transplants," "campaign," and "strengthen" are keywords. Further, the conclusion mention determination unit 143 may include synonyms and conjugations of these phrases in the keywords. Therefore, the conclusion mention determination unit 143 specifies prohibited phrases, and the synonyms or conjugations of phrases included in the utterances by referring to dictionary data stored in the data storage unit 112. The dictionary data representing prohibited phrases, synonyms of a phrase, or conjugations of a phrase is stored in the data storage unit 112 in advance.

Then, the conclusion mention determination unit 143 searches for an utterance including at least one of the keywords determined among utterances in a conversation, as a conclusion mention utterance, and specifies a time of the utterance that it finds as a conclusion mention time. In the example illustrated in FIG. 4, the conclusion mention determination unit 143 finds the utterance "So, what if we organized a campaign with a specific target?" including the keyword "campaign", and the utterance "Well, what about recent transplants to district S?" including the keyword "transplants," as conclusion mention utterances. The conclusion mention determination unit 143 specifies 15:13, Apr. 7, 2015 and 15:14, Apr. 7, 2015, which are utterance start times of the conclusion mention utterances that were found, as conclusion mention times.

(Method of Calculating Conclusion Mention Amount)

Next, a method of calculating a conclusion mention amount will be described.

The conclusion mention determination unit 143 calculates a sum in the conversation of the degree-of-importance function $g(s_i)$ at the conclusion mention time $s_i$ of each speaker i as the conclusion mention amount $R_i$ of the speaker i, as shown in Equation (1).

[Equation 1]

$$R_i = \Sigma g(s_i) \tag{1}$$

In Equation (1), the sum is calculated for each speaker i between utterances. That is, the conclusion mention amount $R_i$ is a weighted number of conclusion mentions in which the degree-of-importance function g(si) is a weight coefficient. A large conclusion mention amount $R_i$ indicates that there are a number of utterances including a keyword which is an element of a conclusion sentence, and indicates that the contribution of the utterances of the speaker i to the conversation is high.

FIG. 5 is a diagram illustrating an example of a degree-of-importance function. In the example illustrated in FIG. 5, the degree-of-importance function g(s) is a function that has a maximum value $g_1$ at a start time of the conversation ($s=s_s$), and gives a positive real number decreasing over time as a degree of importance. The degree-of-importance function g(s) has a minimum value $g_2$ at an end time of the conversation ($s=s_e$). This shows that the conclusion mention utterance of which a conclusion mention time is earlier is important. For example, the degree of importance $g(s_1)$ of the conclusion mention utterance performed at an initial conclusion mention time $s_1$ is higher than that of a subsequent conclusion mention utterance. Further, the degree-of-importance function g(s) gives a much higher degree of importance $g_2$ than that at times before and after a conclusion-inducing utterance performed between a start time $s_{21}$ and an end time $s_{22}$ to the conclusion-inducing utterance. The conclusion-inducing utterance is a conclusion mention utterance that induces a conclusion mention utterance from another speaker. The conclusion mention determination unit 143 determines a conclusion mention utterance having a section in which there is no other conclusion mention utterance in a predetermined time (for example, 5 minutes) immediately before a certain conclusion mention time, and the other conclusion mention utterance continues for a predetermined time or more after the end, to be the conclusion-inducing utterance. A shorter silent section than a predetermined gap time (for example, 1 minute) or a section of an utterance other than the conclusion mention utterance may be included in the section in which other conclusion mention utterances continue. For example, "So, what if we organized a campaign with a specific target?" of speaker Z illustrated in FIG. 4 is the conclusion-inducing utterance. Since such an utterance is important for inducing the conclusion of the conversation, it is given a higher degree of importance than other conclusion mention utterances.
(Method of Calculating Degree of Contribution)

Next, a method of calculating the degree of contribution will be described.

The degree-of-contribution calculation unit 152 performs weighted addition on the degree of activity $U_i$ of the speaker i, the interrupting amount $I_{ij}$ of the speaker j by the speaker i, the interrupted amount $I_{ji}$, and the conclusion mention amount $R_i$ indicated by the speech state data to calculate the degree of contribution $C_i$ of the speaker i, as shown in Equation (2).

[Equation 2]

$$C_i = w_u U_i + w_{i1} \sum_{j=1}^{N} I_{ij} + w_{i2} \sum_{j=1}^{N} I_{ji} + w_r R_i \quad (2)$$

In Equation (2), $w_u$, $w_{i1}$, $w_{i2}$, and $w_r$ indicate weight coefficients by which the degree of activity $U_i$, the interrupting amount $I_{ij}$, the interrupted amount $I_{ji}$, and the conclusion mention amount $R_i$ are multiplied, respectively. However, a sum of the interrupting amount $I_{ij}$ and a sum of the interrupted amount $I_{ji}$ for the other speaker j are multiplied by the weight coefficients $w_{i1}$ and $w_{i2}$, respectively. Accordingly, Equation (2) shows a sum of the index values such as the multiplication value $w_u U_i$ obtained by multiplying the index value such as the degree of activity $U_i$ by the corresponding weight coefficient (for example, $w_u$) as a degree of contribution $C_i$.

When the conclusion section is not predetermined and a keyword in the conclusion sentence is not specified, the conclusion mention amount $R_i$ is not calculated, and accordingly, the addition of $w_r R_i$ of the fourth term on the right of Equation (2) is omitted.
(Evaluation of Combination of Speakers)

The conversation evaluation unit 160 may calculate the degree of contribution $C_i$ according to the conversation including a combination of specific speakers as participants in the evaluation of the combination of the speakers. In general, participants may vary according to conversations. In the example illustrated in FIG. 6, participants in session 1 are two persons including X and Y, participants in session 2 are two persons including X and Z, participants in session 3 are two persons including X and W, participants in session 4 are three persons including X, Y, and W, and participants in session 5 are three persons including X, Z, and W. Here, the conversation evaluation unit 160 specifies the speaker i of each session m from the utterance data read from the data storage unit 112. The conversation evaluation unit 160 counts the number (participant number) of the speaker i participating in each session m among all participants NT in all of M sessions which have already been performed, and the number of participation sessions of each speaker i (participation session number). The number of participants in the session m is $\Sigma_i p_{im}$, and the number of participation sessions is $\Sigma_m p_{im}$. Here, $p_{im}$ is a flag value indicating whether the speaker i has participated in the session m. $p_{im}$ "1" indicates that the speaker i has participated in the session m, and $p_{im}$ "0" indicates that the speaker i has not participated in the session m. For example, the conversation evaluation unit 160 can calculate a sum of the degree of contribution $C_i$ of the speaker i in each session m in which either the speaker $i_1$ or $i_2$ participates, as the degree of contribution $CP_i$, as shown in Equation (3).

[Equation 3]

$$CP_i = \Sigma_{i_1, i_2 \in [1, \ldots, N_T]} p_{i_1 m} p_{i_2 m} C_i \quad (3)$$

The conversation evaluation unit 160 may calculate the degree of contribution $CP_i$ for a combination of speakers specified based on the operation signal from the operation input unit 31 or may calculate the degree of contribution $CP_i$ for each combination including a certain speaker i of interest. The user receiving the degree of contribution $CP_i$ calculated for each combination of the speakers can recognize a combination of speakers increasing the degree of contribution to the conversation or a combination of speakers decreasing the degree of contribution to the conversation, and smoothly perform adjustment of the participants for efficiently performing the conversation.
(Example of Display Screen)

Next, an example of a display screen according to this embodiment will be described.

Figures 6, 7:
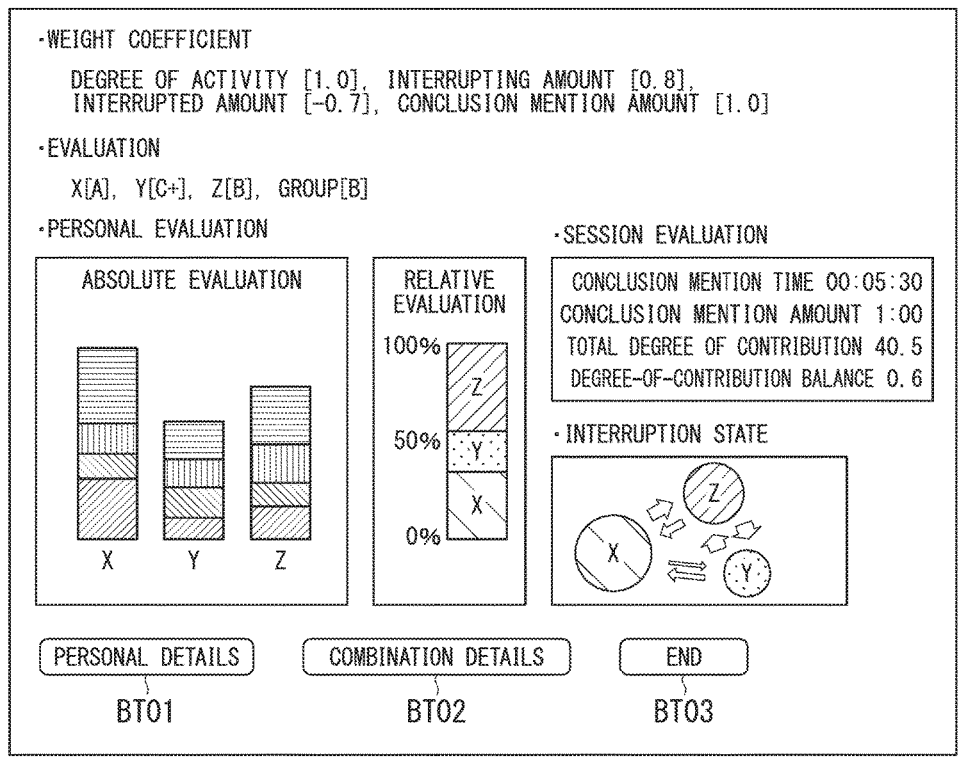
FIG. 6 is a diagram illustrating an example of participants in each session.
FIG. 7 is a diagram illustrating an example of a display screen according to the first embodiment.

FIG. 7 is a diagram illustrating an example (display screen D01) of the display screen according to this embodiment.

The display screen D01 is a general screen including respective items of weight coefficient, evaluation, personal evaluation, session evaluation, and interruption state. In the item of the weight coefficient, an input field for inputting weight coefficients $w_u$, $w_{i1}$, $w_{i2}$, and $w_r$ by which the degree of activity $U_i$, the interrupting amount (interruption level) $I_{ij}$, the interrupted amount (interrupted degree) $I_{ji}$, and the conclusion mention amount (degree of conclusion mention) $R_i$ are multiplied is provided. The input field is a portion indicated by parentheses [ . . . ]. On the basis of the operation signal generated according to an operation input for the user to set a value in the input field, the coefficient setting unit 151 generates coefficient data which represents the set value as the weight coefficient. The degree-of-contribution calculation unit 152 acquires the speech state data from the speech state analysis unit 140, and performs weighted addition on an index value indicated by the speech state data on the basis of the weight coefficient indicated by the coefficient data to calculate the degree of contribution of each speaker.

The evaluation label of each speaker and the evaluation label related to the conversation are displayed in the items of evaluation. In the example illustrated in FIG. 7, A, C+, and B are displayed in parentheses [ . . . ] as the evaluation labels for speakers X, Y, and Z, and B is displayed in parentheses [ . . . ] adjacent to "group" as the evaluation label of the conversation. These evaluation labels are information acquired as presentation information to be displayed on the display screen D01 by the presentation data generation unit 170 among the evaluation labels determined by the conversation evaluation unit 160.

An item of personal evaluation includes display areas of absolute evaluation and relative evaluation. In the display area of the absolute evaluation, the degrees of contribution (absolute evaluation values) $C_i$ of speakers X, Y, and Z are represented by lengths of bar graphs. The bar graph representing the degree of contribution of each speaker is divided into respective components of the degree of activity $U_i$, the interrupting amount $I_{ij}$, the interrupted amount and the conclusion mention amount $R_i$ as breakdowns. A length of each division is proportional to a value obtained by multiplying each index value such as the degree of activity $U_i$ by a weight coefficient $w_u$ or like. Thus, the magnitude of the degree of contribution of each speaker, or the degree of activity, the interrupting amount, the interrupted amount, and the conclusion mention amount of the utterances are visualized as breakdowns.

In the display area of the relative evaluation, divisions of the relative evaluation values of speakers X, Y, and Z are included as breakdowns, and one bar graph in which the entirety thereof is 100% is included. A length of each division is proportional to the degree of contribution $C_i$ or the relative evaluation value $C_i'$ of each speaker i. Such a bar graph is presentation information generated by the presentation data generation unit 170 on the basis of each index value calculated by the speech state analysis unit 140, the degree of contribution calculated by the degree-of-contribution calculation unit 152, and the relative evaluation value calculated by the conversation evaluation unit 160. Thus, a proportion of the degree of contribution $C_i$ of each speaker i is visualized.

In the item of the session evaluation, the conclusion mention time, the conclusion mention amount, the total degree of contribution, and degree-of-contribution balance are displayed as evaluation values for the conversation which is an analysis target. The conclusion mention time is a sum of the utterance time of the conclusion mention utterance in the conversation. The conclusion mention amount is a sum between the participants in the session of the conclusion mention amount $R_i$ of each speaker i. The total degree of contribution is a sum between the participants in the session of the degree of contribution $C_i$ of each speaker i. The contribution balance is the degree-of-contribution ratio P described above. These evaluation values are information that the presentation data generation unit 170 has acquired as the presentation information to be displayed on the display screen D01 on the basis of the conclusion mention time and the conclusion mention amount determined by the speech state analysis unit 140, the degree of contribution calculated by the degree-of-contribution calculation unit 152, and the relative evaluation value calculated by the conversation evaluation unit 160.

In the item of the interruption state, the interrupting amount and the interrupted amount between the speakers in the conversation which is an analysis target are displayed. Letters X, Y, and Z at centers of three circles indicate speakers X, Y, and Z.

A radius of each circle is proportional to the degree of contribution of the speaker. Thicknesses of an arrow from the circle of a certain speaker to the circle of another speaker and an arrow from the circle of the other speaker to the circle of the certain speaker are proportional to the interrupting amount $I_{ij}$ and the interrupted amount $I_{ji}$, respectively. In the example illustrated in FIG. 7, thick arrows between the circle of speaker Y and the circle of speaker Z indicate much interruption between the speakers Y and Z, and thin arrows between the circle of speaker X and the circle of speaker Y indicate less interruption between the speakers X and Y. Thus, the degree of interruption between the speakers is visualized.

The display screen D01 further includes buttons BT01, BT02, and BT03 with text of "personal details," "combination details," and "end." The button BT01 is a button that is pressed to cause the presentation data generation unit 170 to display a display screen D02 (which will be described below), and to erase the display screen D01 that is displayed at that time point. Here, "press" means that an operation signal for indicating an item according to the display or coordinates in the display area is input in response to an operation input of the user. The button BT02 is a button that is pressed to cause the presentation data generation unit 170 to display a display screen D03 (which will be described below), and to erase the display screen D01 that is displayed at that time point. The button BT03 is a button for causing the presentation data generation unit 170 not to display on other display screens and erasing the display screen D01 that is displayed at that time point.

Figure 8:
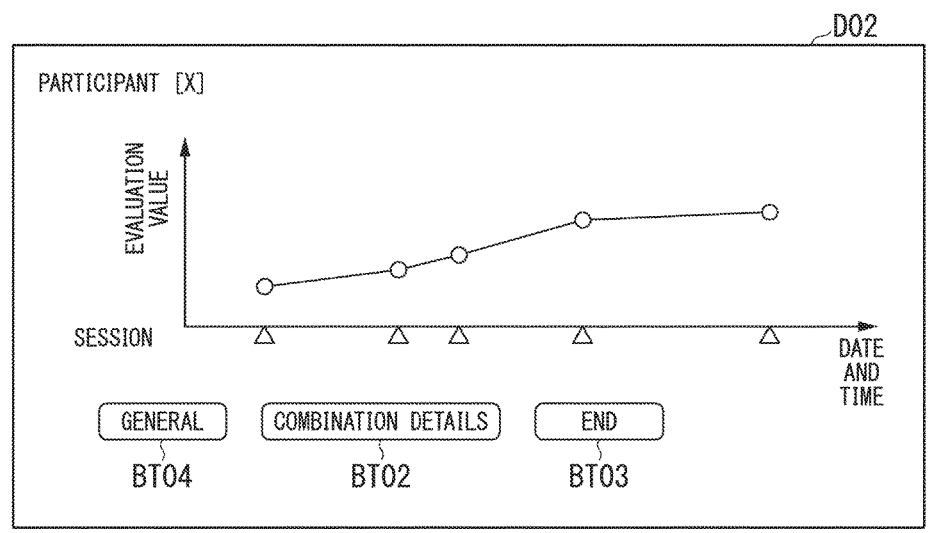
FIG. 8 is a diagram illustrating another example of a display screen according to the first embodiment.

FIG. 8 is a diagram illustrating another example (display screen D02) of the display screen according to this embodiment.

The display screen D02 is a personal detail screen on which the degree of contribution to each conversation of an individual speaker is displayed. The display screen D02 has an input field represented by "participant" and parentheses [ . . . ] as a title. This input field is an input field for receiving an operation input from the user for setting a name or identification information of speaker X. The degree-of-contribution calculation unit 152 calculates, for each session, the degree of contribution of speaker X indicated by an operation signal generated by the operation input.

In the display screen D02, a line graph showing the degree of contribution (session) on each date and time on which a set conversation (session) of speaker X is performed is displayed. The degree of contribution associated with the date and time represented by the line graph is information obtained by the presentation data generation unit 170 acquiring, as the presentation information, the degree of contribution of each session calculated by the degree-of-contribution calculation unit 152. In the example shown in the display screen D02, the degree of contribution increases over date and time. By such a display, a change according to the session of the degree of contribution to the conversation of each speaker is visualized. Thus, the user can recognize, for example, improvement of conversation technique or an opportunity for change.

The display screen D02 further include buttons BT04, BT02, and BT03 with text "general," "combination details," and "end." The button BT04 is a button that is pressed to cause the presentation data generation unit 170 to display the display screen D01, and to erase the display screen D02 that is displayed at that time point.

Figure 9:
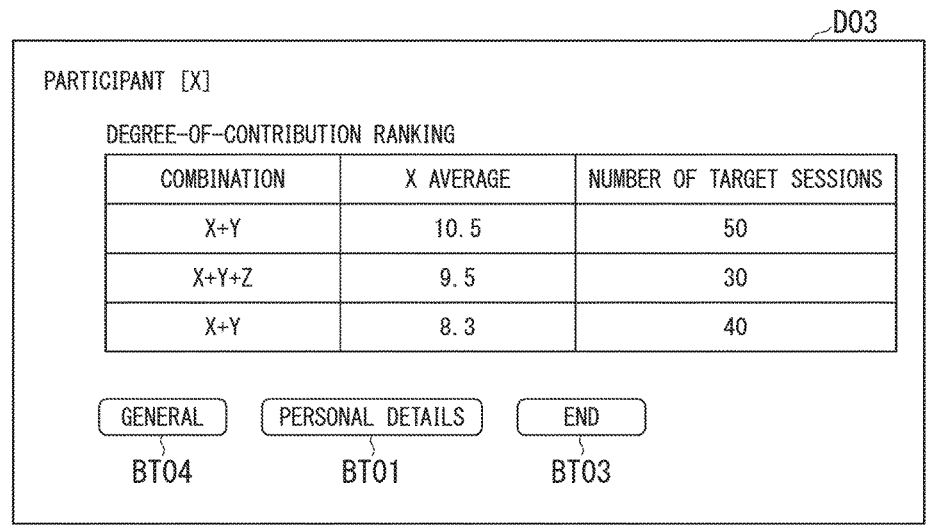
FIG. 9 is a diagram illustrating still another example of the display screen according to the first embodiment.

FIG. 9 is a diagram illustrating still another example (display screen D03) of the display screen according to this embodiment.

The display screen D03 is a combined detail screen in which the degree of contribution of each combination of speakers including a speaker is displayed. The display screen D03 has an input field represented by "participant" and parentheses [ . . . ] as a title. This input field is an input field for receiving an operation input of a user for setting a name or identification information of the speaker. The conversation evaluation unit 160 calculates a degree of contribution $C_X$ of speaker X in a conversation including a combination of speakers including speaker X indicated by the operation signal generated by the operation input.

In the display screen D03, the set combination of the speakers including speaker X, an average value (X average) of the degree of contribution $C_X$ in a conversation (target session) in which the combination of speakers is included as participants, and the number of conversations (the number of target sessions) are shown in association with one another. The average value of the degree of contribution $C_X$ in each conversation is a value obtained by dividing the degree of contribution $CP_X$ of each combination of the speaker calculated for each conversation by the conversation evaluation unit 160 (see Equation (3)) by the number of target sessions related to the combination, which is information acquired as presentation information by the presentation data generation unit 170.

In the example illustrated in FIG. 9, for example, for a combination (X+Y) of speakers X and Y, an average value of the degree of contribution $C_X$ of speaker X is 10.5, and the number of interlocutions is 50. For a combination (X+Y+Z) of speakers X, Y, and Z, an average value of the degree of contribution $C_X$ of speaker X is 9.5, and the number of interlocutions is 30. For a combination (X+Z) of speakers X and Z, an average value of the degree of contribution $C_X$ of speaker X is 8.3, and the number of interlocutions is 40. Accordingly, in the example illustrated in FIG. 9, the degree of contribution of speaker X is high in a conversation in which speaker X participates in combination with speaker Y, and low in a conversation in which speaker X participates in combination with speaker Z. Accordingly, the user can recognize dependency of the degree of contribution on the combination of speakers even for the same speaker X. The user may find, for example, a combination of participants in which contribution by utterances of speaker X is expected or a combination of participants in which the contribution is not expected.

The display screen D03 further includes buttons BT04, BT01, and BT03 with text "general," "personal details," and "end."

(Conversation Analysis Process)

Next, a conversation analysis process according to this embodiment will be described.

Figure 10:
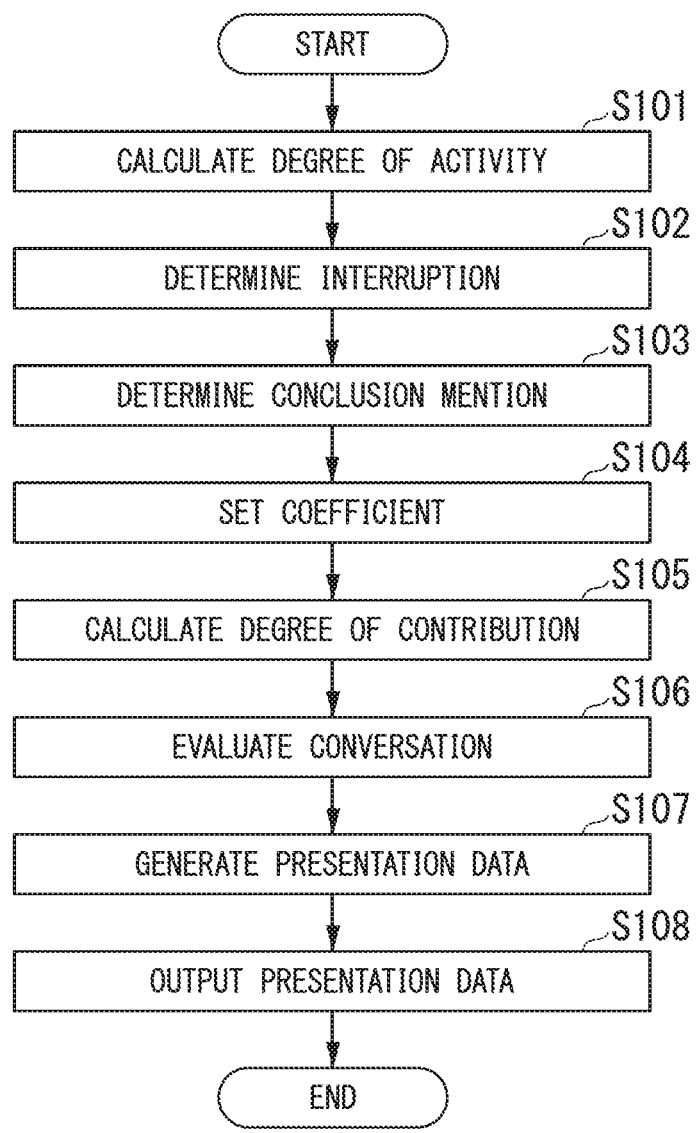
FIG. 10 is a flowchart illustrating a conversation analysis process according to the first embodiment.

FIG. 10 is a flowchart of a conversation analysis process according to this embodiment.

(Step S101) The degree-of-activity calculation unit 141 calculates a sum of the speaker i participating in the conversation, of the effective utterance amount $u_{ij}$ according to the utterance time d which is duration of each utterance section indicated by the utterance section data included in the utterance data, as the degree of activity $U_i$. Then, the process proceeds to step S102.

(Step S102) The interruption determination unit 142 determines interruption by a certain speaker i of the utterance of another speaker j on the basis of the utterance section of each speaker indicated by the utterance time data. The interruption determination unit 142 multiplies the effective utterance amount $u_{ij}$ of the utterance of the interruption by a coefficient according to whether or not the interruption succeeds, and calculates a sum of the utterance-specific interruption amount related to the interruption in the conversation of the utterance-specific interruption amount as the interrupting amount $I_{ij}$. Further, the interruption determination unit 142 calculates a sum in the conversation of the effective utterance amount $u_{ji}$ of each utterance of the other speaker j interrupting the speaker i as the interrupted amount $I_{ji}$. Then, the process proceeds to step S103.

(Step S103) The conclusion mention determination unit 143 acquires text data indicating a conclusion sentence representing the conclusion of the conversation. The conclusion mention determination unit 143 determines a conclusion mention section including a keyword which is an element of the conclusion sentence in the text data representing the utterances of each speaker i in the conversation. The conclusion mention determination unit 143 calculates a conclusion mention amount $R_i$ on the basis of the determined conclusion mention section. Then, the process proceeds to step S104.

(Step S104) The coefficient setting unit 151 determines a weight coefficient related to each of the degree of activity, the interrupting amount, the interrupted amount, and the conclusion mention amount, which are index values indicating the speech state. Then, the process proceeds to step S105.

(Step S105) The degree-of-contribution calculation unit 152 calculates, as the degree of contribution $C_i$, a sum of multiplication values obtained by multiplying the degree of activity, the interrupting amount, the interrupted amount, and the conclusion mention amount, which are index values of each speaker i, by related weight coefficients. Then, the process proceeds to step S106.

(Step S106) The conversation evaluation unit 160 acquires an evaluation value indicating a contribution state between the speakers in the conversation on the basis of the degree of contribution $C_i$ of each speaker, such as a degree-of-contribution ratio, an evaluation label, and the degree of contribution $CP_i$ of a specific speaker i for each combination of speakers.

(Step S107) The presentation data generation unit 170 generates presentation data representing the presentation information of the item according to the indicated display screen on the basis of the index value indicating the speech state, the degree of contribution of each speaker, and the evaluation value indicating the contribution state between the speakers. Then, the process proceeds to step S108.

(Step S108) The presentation data generation unit 170 outputs the generated presentation data to the display unit 33 via the input and output unit 110 to display presentation information. Then, the process illustrated in FIG. 10 ends.

As described above, the conversation analysis device 10 according to this embodiment includes the utterance data acquisition unit 120 that acquires the utterance data representing the voice of the speaker and the utterances of the speaker. Further, the conversation analysis device 10 includes the speech state analysis unit 140 that analyzes the speech state of each speaker on the basis of the voice, and the degree-of-contribution calculation unit 152 that calculates the degree of contribution to the conversation of each speaker on the basis of the speech state.

With this configuration, the degree of contribution quantitatively indicating the degree of contribution of the speaker participating in the conversation is acquired. Efficiency of the conversation is achieved by encouraging the contribution of the speaker to the conversation on the basis of the degree of contribution.

Further, the speech state analysis unit 140 includes the degree-of-activity calculation unit 141 that calculates a degree of activity in the conversation on the basis of the utterance time as the speech state.

With this configuration, a degree of activity quantitatively indicating the degree of activity of the utterances of the speaker participating in the conversation is acquired. Efficiency of conversation is achieved by encouraging active utterances in the interlocution of the speaker on the basis of the degree of activity.

Further, the speech state analysis unit 140 includes an interruption determination unit 142 that determines interruption of an utterance of another speaker as the speech state.

With this configuration, the interruption of the utterance to another speaker is determined as the speech state. Efficiency of the conversation is achieved by avoiding interruption of the speaker or encouraging valid interruption on the basis of a determined degree of interruption of the utterance.

Further, the speech state analysis unit 140 includes the conclusion mention determination unit 143 that determines mention of an element of the conclusion of the conversation as the speech state.

According to this configuration, the utterances mentioning the element of the conclusion are specified as the speech state. Efficiency of the conversation is achieved by encouraging the speaker to produce utterances inducing the conclusion based on the degree of the specified utterance mentioned as the element of the conclusion.

Further, the conversation evaluation unit 160 that calculates the evaluation value indicating the contribution state between the speakers in the conversation on the basis of the degree of contribution of each speaker is included.

According to this configuration, the evaluation value quantitatively indicating the contribution state between speakers participating in the conversation is acquired. Efficiency of the conversation is achieved by encouraging improvement of the contribution state between the speakers on the basis of the evaluation value.

Second Embodiment

Next, a second embodiment of the present invention will be described. The same configurations as those in the above-described embodiment are denoted with the same reference numerals, and a description thereof will be omitted.

Figure 11:
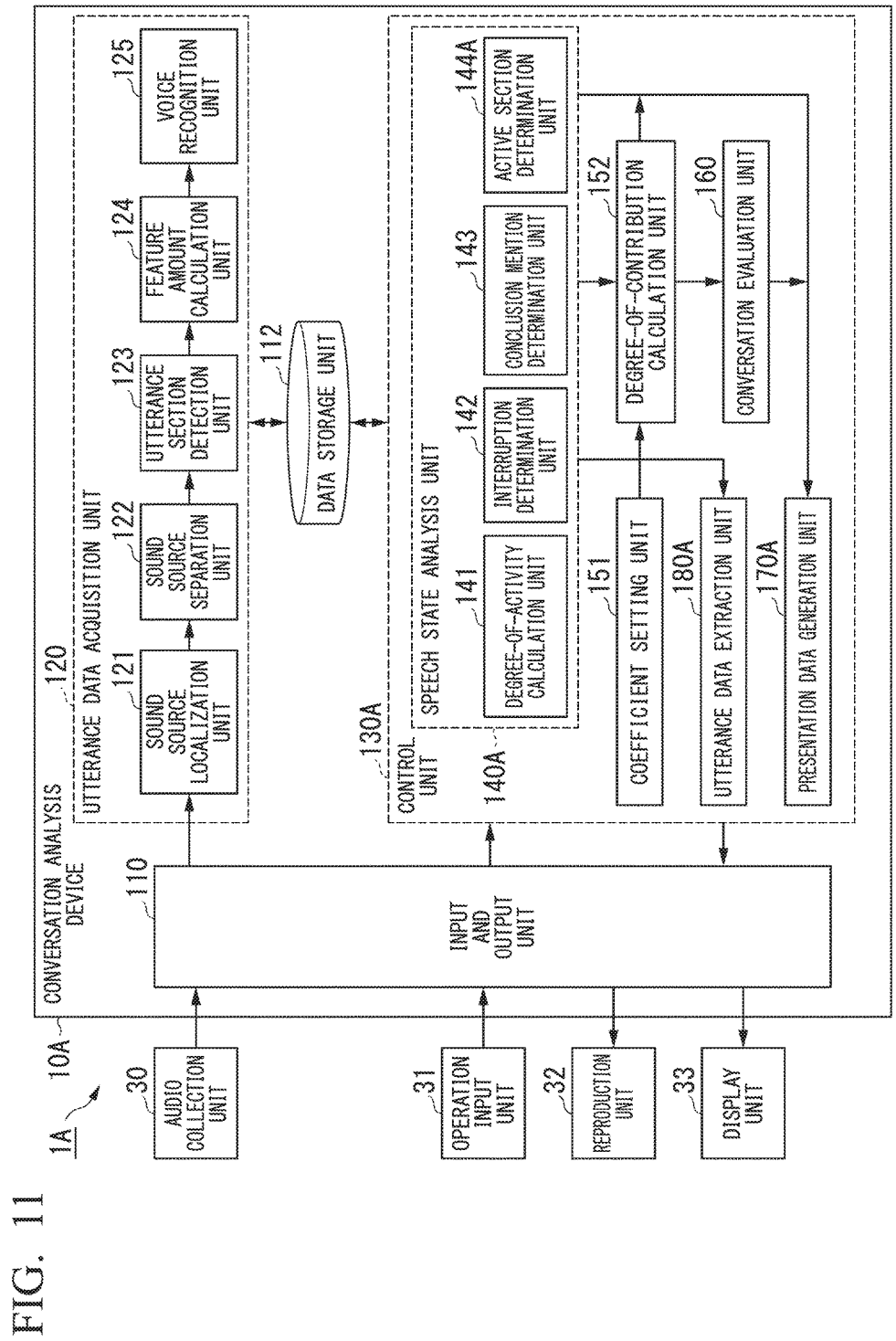
FIG. 11 is a block diagram illustrating a configuration of a conversation analysis system according to a second embodiment.

FIG. 11 is a block diagram illustrating a configuration of a conversation analysis system 1A according to this embodiment.

The conversation analysis system 1A includes a conversation analysis device 10A, a sound collection unit 30, an operation input unit 31, a reproduction unit 32, and a display unit 33.

The conversation analysis device 10 includes an input and output unit 110, a data storage unit 112, an utterance data acquisition unit 120, and a control unit 130A.

The control unit 130A includes a speech state analysis unit 140A, a coefficient setting unit 151, a degree-of-contribution calculation unit 152, a conversation evaluation unit 160, a presentation data generation unit 170A, and an utterance data extraction unit 180A.

The speech state analysis unit 140 includes a degree-of-activity calculation unit 141, an interruption determination unit 142, a conclusion mention determination unit 143, and an active section determination unit 144A.

The active section determination unit 144A determines an active section in which a degree of activity of an utterance is much higher than a predetermined degree of activity in other sections on the basis of the sound-source-specific audio signal corresponding to the utterance section indicated by the utterance section data included in the utterance data. The active section determination unit 144A outputs active section data indicating the specified active section to the utterance data extraction unit 180A.

The active section determination unit 144A specifies, for example, a section in which each of a relative volume and a relative pitch for each speaker serving as the degree of activity is higher than a predetermined threshold, as the active section. The active section specified using this scheme is typically often a section of an utterance emphasized by the speaker. Here, the active section determination unit 144A calculates a power and a pitch indicating an amount of a voice at predetermined time intervals (for example, 50 ms) for the sound-source-specific audio signal for each speaker, and specifies phonemes of the section by referring to the text data. The active section determination unit 144A normalizes the calculated power and the calculated pitch using an average power and an average pitch of the specified phonemes by referring to reference voice data for each speaker prestored in the data storage unit 112 and calculates the relative volume and the relative pitch.

As a prerequisite, the control unit 130A calculates power indicating volume, and a pitch for a sound-source-specific audio signal of each speaker at each predetermined time (for example, 50 ms), and performs a comparison with text data indicating the phonemes in the section to calculate an average power and an average pitch of each phoneme in advance. The control unit 130A prestores reference voice data indicating the calculated average power and the calculated average pitch of each phoneme in the data storage unit 112 for each speaker.

The utterance data extraction unit 180A extracts the utterance data in the utterance section including the active section indicated by the active section data input from the active section determination unit 144A on the basis of the utterance section data. The utterance data extraction unit 180A outputs image data representing an image of the text represented by the text data included in the extracted utterance data to the display unit 33. The text representing the utterances in the utterance section is displayed on the display unit 33. Further, the utterance data extraction unit 180A outputs the sound-source-specific audio signal included in the utterance data to the reproduction unit 32. From the reproduction unit 32, a voice of the utterance in the utterance section is reproduced.

(Utterance Data Output Process)

Next, an utterance data output process according to this embodiment will be described.

Figure 12:
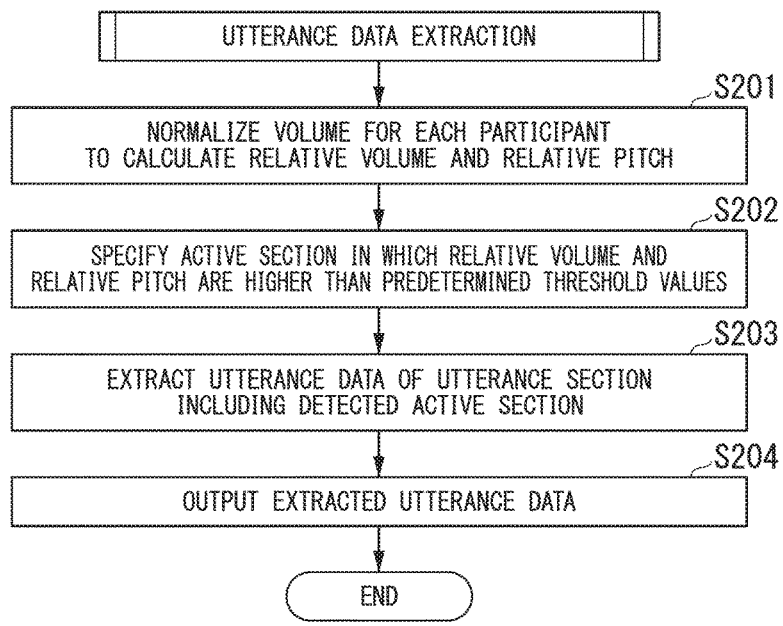
FIG. 12 is a flowchart illustrating an example of an utterance data output process according to the second embodiment.

FIG. 12 is a flowchart illustrating an example of an utterance data output process according to this embodiment.

An example of the utterance data output process illustrated in FIG. 12 includes a case in which the active section is detected based the relative volume and the relative pitch.

(Step S201) The active section determination unit 144A calculates a power and a pitch of the sound-source-specific audio signal for each speaker at predetermined time intervals, and specifies phonemes of the section by referring to the text data. The active section determination unit 144A normalizes the calculated power and the calculated pitch using the average power and the average pitch of the specified phonemes by referring to the reference voice data prestored in the data storage unit 112 to calculate a relative volume and a relative pitch. Then, the process proceeds to step S202.

(Step S202) The active section determination unit 144A specifies a section in which the relative volume and the relative pitch are higher than predetermined threshold values as an active section. Then, the process proceeds to step S203.

(Step S203) The utterance data extraction unit 180A extracts the utterance data of the utterance section including the active section indicated by the active section data input from the active section determination unit 144A based on the utterance section data. Then, the process proceeds to step S204.

(Step S204) The utterance data extraction unit 180A outputs image data representing an image of text represented by the text data included in the extracted utterance data to the display unit 33. Further, the utterance data extraction unit 180A outputs the sound-source-specific audio signal included in the utterance data to the reproduction unit 32. Then, the process illustrated in FIG. 12 ends.

While the example in which the active section determination unit 144A determines the active section based on both the relative volume and the relative pitch has been described above, the present invention is not limited thereto. The active section determination unit 144A may determine the active section based on any one of the relative volume and the relative pitch.

(Use of Degree of Climax)

The active section determination unit 144A may specify a section in which a degree of climax of an utterance is higher than a predetermined threshold value of degree of the climax in the determination of the active section. The degree of climax of the utterance is another index indicating the degree of activity of the utterance. The degree of climax of the utterance is an index quantitatively indicating a degree of change of the speakers in the conversation at each time. The active section determination unit 144A calculates the degree of climax f(t) using, for example, Equation (4) on the basis of the sound-source-specific audio signal and the utterance section data.

[Equation 4]

$$f(t) = \sum_l v_l e^{-a(t-t_l)} \quad (4)$$

In Equation (4), t denotes time. $v_l$ denotes the relative volume of an utterance l. The relative volume $v_l$ is an element indicating that the activity of an utterance is higher as the volume of the speaker is higher. In other words, the relative volume $v_l$ indicates that a contribution of the utterance l is higher as the volume is higher. The relative volume $v_l$ can be calculated using the sound-source-specific audio signal as described above. α is an attenuation constant representing a decrease in the contribution of the utterance l according to time elapsed from the utterance start time $t_l$. The utterance start time $t_l$ is specified using the utterance section data. That is, the attenuation constant α is a positive real number representing a decrease in activity due to a continued utterance of a specific speaker without changing to another speaker. Equation (4) shows that the degree of climax f(t) is calculated by accumulating the contributions of each utterance over time. Therefore, the degree of climax f(t) is higher as change of the speaker is more frequent and lower as the change of the speaker is lower. Further, the degree of climax f(t) is higher as the relative volume is higher and lower as the relative volume is lower.

The example shown in Equation (4) shows that the degree of climax f(t) is calculated by adding the contributions of each utterance l, but the present invention is not limited thereto. The active section determination unit 144A may calculate the degree of climax f(t) by adding contribution of each set including a plurality of temporally adjacent utterances. In this case, the active section determination unit 144A uses a predetermined normalized value v instead of the relative volume $v_l$ of each utterance l. When one set has a unit shorter than that of the conversation, the number of utterances included in each set may be a predetermined number or a duration of each set may be a predetermined period of time.

Next, the utterance data output process when an active section is determined using the degree of climax will be described.

Figure 13:
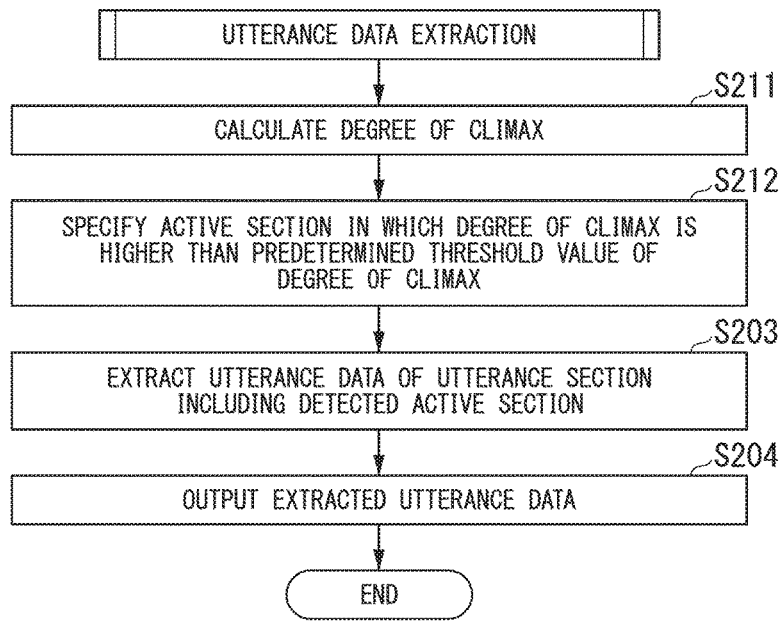
FIG. 13 is a flowchart illustrating another example of the utterance data output process according to the second embodiment.

FIG. 13 is a flowchart illustrating another example of the utterance data output process according to this embodiment.

The utterance data output process illustrated in FIG. 13 includes steps S211, S212, S203, and S204.

(Step S211) The active section determination unit 144A calculates a degree of climax on the basis of the sound-source-specific audio signal and the utterance section data at predetermined time intervals. Then, the process proceeds to step S212.

(Step S212) The active section determination unit 144A specifies, as the active section, a section in which the calculated degree of climax is higher than a predetermined threshold of the degree of climax. Then, the process proceeds to step S203.

In this embodiment, the degree-of-activity calculation unit 141 may determine an effective utterance amount of the utterance including the active section to be a value higher than effective utterance amounts of other utterances. Accordingly, the degree-of-activity calculation unit 141 can calculate the degree of activity $U_i$ by emphasizing an utterance related to the active section in which the degree of activity of the utterance is high, relative to the other utterances. Therefore, since the degree of activity $U_i$ in which the degree of activity of the utterance is reflected in addition to the length of the utterance is calculated as the speech state, the degree of contribution of the utterance or the evaluation value of the conversation is calculated more accurately.

As described above, the conversation analysis device 10A according to this embodiment further includes an utterance data extraction unit 180A that specifies an utterance including a section in which activity of the utterance is higher than a predetermined activity threshold in the utterance data.

With this configuration, the utterance including the section in which the activity is high among utterances forming the conversation is extracted as an utterance having a high contribution to the conversation. It is possible to efficiently perform recognition of content of the utterance or analysis of a speech state in the conversation on the basis of the extracted utterance.

While embodiments of the present invention have been described above with reference to the drawings, a specific configuration is not limited to the above-described configuration, and various design modifications can be made without departing from the gist of the present invention.

For example, in the conversation analysis system 1 or 1A, the number of the sound collection units 30 may be plural. In this case, the utterance data acquisition unit 120 may acquire the audio signal acquired by the respective sound collection units 30 as the sound-source-specific sound source signal. In this case, the sound source localization unit 121 and the sound source separation unit 122 may be omitted. Further, each of the sound collection units 30 may acquire the audio signal of at least one channel.

Further, the utterance data acquisition unit 120 may not necessarily generate the utterance data on the basis of the audio signal from the sound collection unit 30, and may acquire utterance data generated by another device via the input and output unit 110. In this case, the sound collection unit 30 may be omitted.

Further, the conversation analysis device 10 or 10A may be integrated with any one or a combination of the sound collection unit 30, the operation input unit 31, the reproduction unit 32, and the display unit 33, and configured as a single conversation analysis device.

Some units of the conversation analysis device 10 or 10A in the above-described embodiment, such as the utterance data acquisition unit 120 and the control unit 130 or 130A may be realized by a computer.

In this case, the present invention may be realized by recording a program for realizing the control function on a computer-readable recording medium, loading the program recorded on the recording medium into a computer system, and executing the program. Further, a program for realizing the function of the utterance data acquisition unit 120 and a program for realizing the function of the control unit 130 or 130A may be separate. Here, the "computer system" is assumed to be a computer system embedded in the conversation analysis device 10 or 10A and include an OS or hardware such as a peripheral device. Further, the "computer-readable recording medium" refers to a portable medium such as a flexible disk, a magneto-optical disc, a ROM, or a CD-ROM, or a storage device such as a hard disk embedded in the computer system. Further, the "computer-readable recording medium" also includes a recording medium that dynamically holds a program for a short period of time, such as a communication line when the program is transmitted over a network such as the Internet or a communication line such as a telephone line or a recording medium that holds a program for a certain period of time, such as a volatile memory inside a computer system including a server and a client in such a case. Further, the program may be a program for realizing some of the above-described functions or may be a program capable of realizing the above-described functions in combination with a program previously recorded in the computer system.

Further, some units or all units of the conversation analysis device 10 or 10A in the above-described embodiment and modification examples may be realized as an integrated circuit such as an LSI (Large Scale Integration). Respective functional blocks of the conversation analysis device 10 or 10A may be individually implemented as a processor or some or all of the functional blocks may be integrated and implemented as a processor. Further, an integrated circuit scheme is not limited to the LSI, and the device may be realized with a dedicated circuit or a general-purpose processor. Further, if an integrated circuit technology replacing LSI emerges as a result of advances in semiconductor technology, an integrated circuit according to the technology may be used.

While embodiments of the present invention has been described in detail with reference to the drawings, a specific configuration is not limited to the above-described configuration, and various design modifications can be made without departing from the gist of the present invention.

What is claimed is:

1. A conversation analysis device comprising circuitry configured as:
   an utterance data acquisition unit that acquires utterance data representing a voice of each speaker and an utterance of the speaker;
   a speech state analysis unit that analyzes a speech state of each speaker on the basis of the voice; and
   a degree-of-contribution calculation unit that calculates a degree of contribution to the conversation of each speaker on the basis of the speech state, wherein:
   the speech state analysis unit calculates at least a conclusion mention amount as the speech state,
   a conclusion mention is an utterance mentioning an element of a conclusion of the conversation,
   the conclusion mention amount is a weighted number of conclusion mentions in which a degree-of-importance function is a weight coefficient,
   wherein the degree-of-importance function is a function that has a maximum value at a start time of the conversation and a minimum value at an end time of the conversation and is associated with a positive real number decreasing over time as a degree of importance,
   wherein the degree-of-importance function gives a much higher degree of importance than that at times before and after a conclusion-inducing utterance performed between the start time and the end time to the conclusion-inducing utterance, and
   wherein the conclusion-inducing utterance is a conclusion mention utterance that induces a conclusion mention utterance from another speaker,
   a presentation data generation unit generating presentation data based on the degree of contribution to the conversation of each speaker or the degree-of-importance function, and
   a display screen displaying the presentation data, including a relative evaluation associated with the degree of contribution each speaker.

2. The conversation analysis device according to claim 1, wherein the speech state analysis unit includes a degree-of-activity calculation unit that calculates a degree of activity in the conversation on the basis of an utterance time as the speech state.

3. The conversation analysis device according to claim 1, wherein the speech state analysis unit includes an interruption determination unit that determines interruption of an utterance of another speaker as the speech state.

4. The conversation analysis device according to claim 1, wherein a conclusion mention utterance having a section, in which there is no other conclusion mention utterance in a first predetermined time immediately before a certain conclusion mention time and the other conclusion mention utterance continues for a second predetermined time or more after the end, is determined as the conclusion-inducing utterance.

5. The conversation analysis device according to claim 1, comprising circuitry configured as:
   a conversation evaluation unit that calculates an evaluation value indicating a contribution state between speakers in the conversation on the basis of the degree of contribution of each speaker.

6. The conversation analysis device according to claim 1, comprising circuitry configured as:
   an utterance data analysis unit that specifies an utterance including a section in which activity of the utterance is higher than a predetermined threshold of the activity in the utterance data.

7. A conversation analysis method in a conversation analysis device, comprising circuitry configured to:
   an utterance data acquisition step of acquiring utterance data representing a voice of each speaker and an utterance of the speaker;
   a speech state analysis step of analyzing a speech state of each speaker on the basis of the voice;
   a degree-of-contribution calculation step of calculating a degree of contribution to the conversation of each speaker on the basis of the speech state;
   a second speech state analysis step of calculating at least a conclusion mention amount as the speech state,
   wherein a conclusion mention is an utterance including a mentioning of an element of a conclusion of the conversation, and
   wherein the conclusion mention amount is a weighted number of conclusion mentions in which a degree-of-importance function is a weight coefficient,
   wherein the degree-of-importance function is a function that has a maximum value at a start time of the conversation and a minimum value at an end time of the conversation and is associated with a positive real number decreasing over time as a degree of importance,
   wherein the degree-of-importance function gives a much higher degree of importance than that at times before and after a conclusion-inducing utterance performed between the start time and the end time to the conclusion-inducing utterance, and wherein the conclusion-inducing utterance is a conclusion mention utterance that induces a conclusion mention utterance from another speaker, a presentation data generation step of generating presentation data based on the degree of contribution to the conversation of each speaker or the degree-of-importance function, and a display step of displaying the presentation data, including a relative evaluation associated with the degree of contribution each speaker.

8. A computer-readable non-transitory recording medium including a program for causing a computer of a conversation analysis device including circuitry to execute:

an utterance data acquisition process of acquiring utterance data representing a voice of each speaker and an utterance of the speaker;

a speech state analysis process of analyzing a speech state of each speaker on the basis of the voice;

a degree-of-contribution calculation process of calculating a degree of contribution to the conversation of each speaker on the basis of the speech state;

a second speech state analysis process of calculating at least a conclusion mention amount as the speech state, wherein a conclusion mention is an utterance including a mentioning of an element of a conclusion of the conversation, and wherein the conclusion mention amount is a weighted number of conclusion mentions in which a degree-of-importance function is a weight coefficient, wherein the degree-of-importance function is a function that has a maximum value at a start time of the conversation and a minimum value at an end time of the conversation and is associated with a positive real number decreasing over time as a degree of importance, wherein the degree-of-importance function gives a much higher degree of importance than that at times before and after a conclusion-inducing utterance performed between the start time and the end time to the conclusion-inducing utterance, and wherein the conclusion-inducing utterance is a conclusion mention utterance that induces a conclusion mention utterance from another speaker, a presentation data generation process of generating presentation data based on the degree of contribution to the conversation of each speaker or the degree-of-importance function, and a display process of displaying the presentation data, including a relative evaluation associated with the degree of contribution each speaker.

\* \* \* \* \*